C. G. E. TRUMELET-FABER.
SAVING APPARATUS FOR AVIATORS.
APPLICATION FILED OCT. 2, 1913.
1,105,049.
Patented July 28, 1914.
2 SHEETS—SHEET 2.
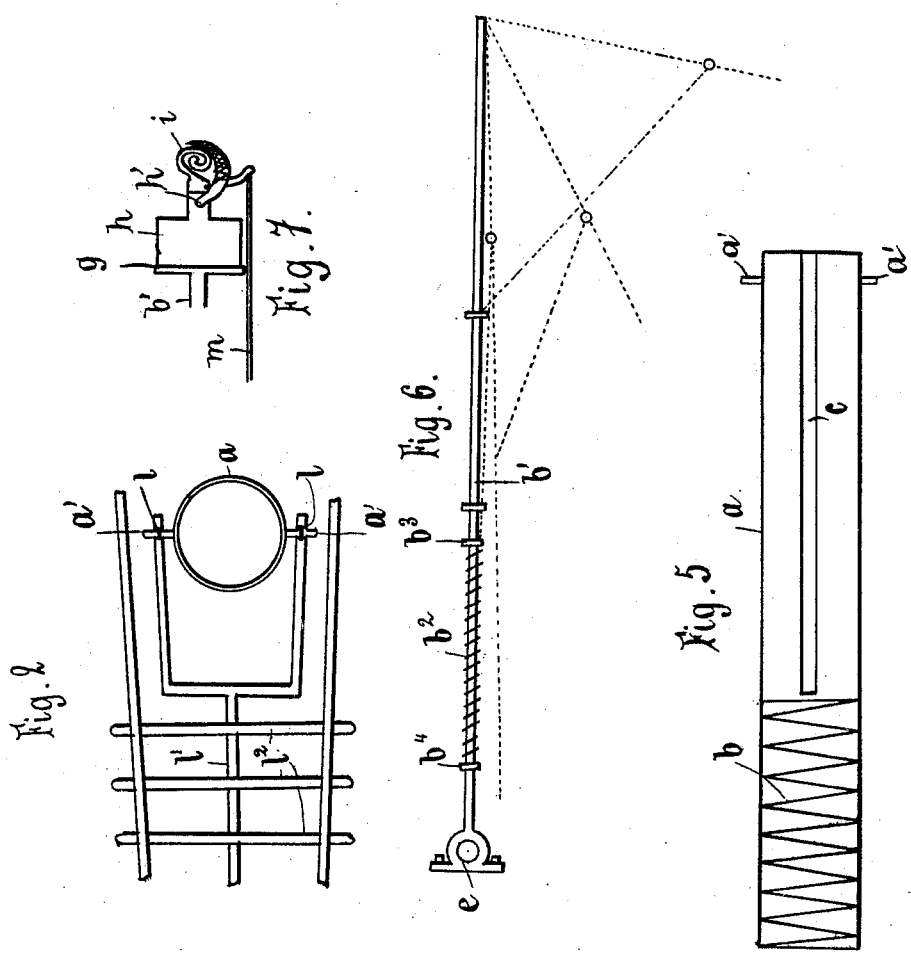
Attest:
Ewd R. Johson
H. L. Alden
Inventor:
Corneille G. E. Trumelet-Faber,
by Wm Wallace White
Atty.

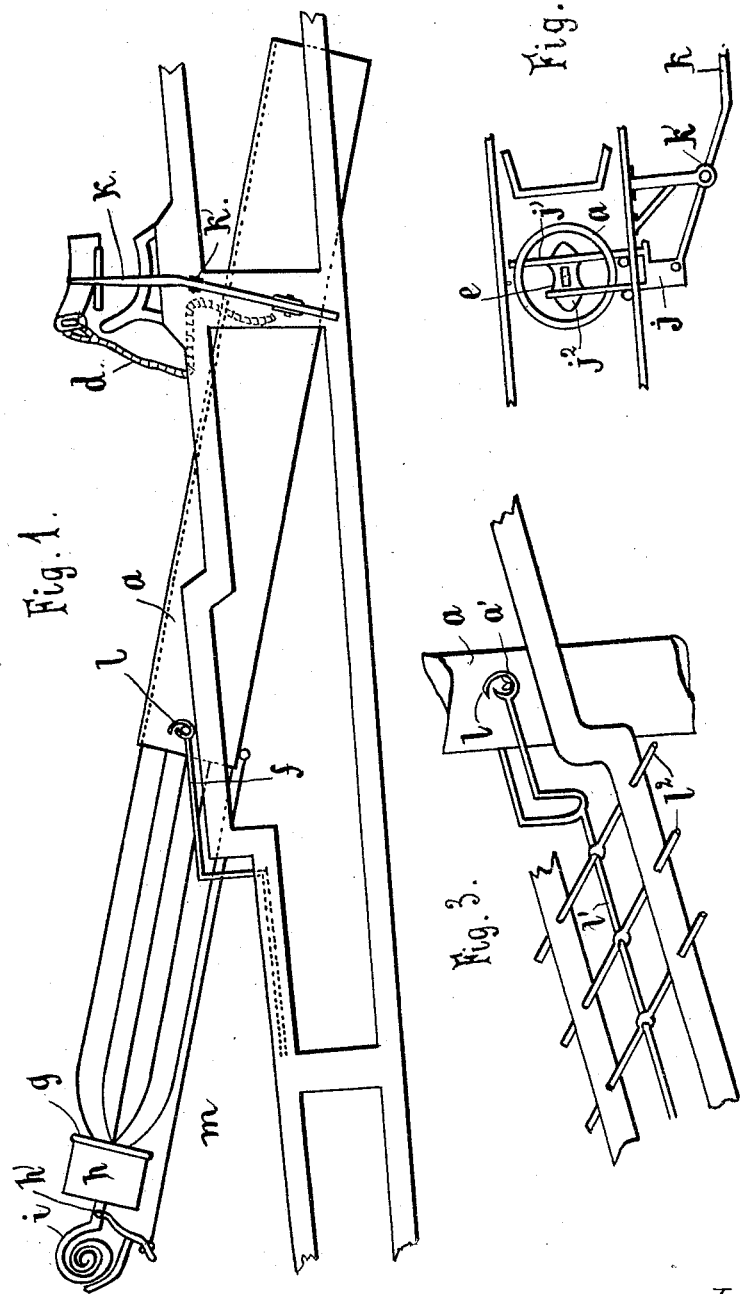

UNITED STATES PATENT OFFICE.

CORNEILLE GUSTAVE ERNEST TRUMELET-FABER, OF PARIS, FRANCE.

SAVING APPARATUS FOR AVIATORS.

1,105,049.  Specification of Letters Patent.  Patented July 28, 1914.

Application filed October 2, 1913. Serial No. 793,028.

*To all whom it may concern:*

Be it known that I, CORNEILLE GUSTAVE ERNEST TRUMELET-FABER, residing at 5 Rue Fourcroy, Paris, France, have invented certain new and useful Improvements in Saving Apparatus for Aviators, of which the following is a specification.

The apparatus according to this invention consists of a cylindrical tube with a parachute. The frame of this parachute is similar to the frame of an umbrella including the handle. The device for operating the parachute is arranged in easy access of the aviator.

The accompanying drawing shows by way of example one form of construction of the invention.

Figure 1 is an elevation illustrating the arrangement of the parachute. Fig. 2 is a plan view of the support of the parachute. Fig. 3 is a perspective view of Fig. 2. Fig. 4 is a plan view of the locking device. Fig. 5 shows the tubular parachute holder. Fig. 6 is a diagrammatic view of the parachute. Fig. 7 is an elevation of the balloon and the gas box.

The apparatus comprises a cylindrical tube $a$ of wood or of metal closed at one end and containing a spiral spring $b$ and a closed parachute. The tube is provided with a slot $c$ for the passage of a string $d$ one end of which is fixed to the lower part $e$ of the handle of the parachute and the other end of which is fixed to the body of the aviator. The open end of the tube is provided with two pivot pins $a^1$ standing perpendicular to the axis of the tube and by means of which the tube is suspended in the holder $f$.

The parachute consists of a frame similar to the frame of an umbrella the handle $b^1$ of which is surrounded by a spiral spring $b^2$ bearing against the sleeve $b^3$ which carries the levers of the frame of the parachute. This spring serves for maintaining the parachute in the open position and it is compressed when the parachute is closed. The other end of this spring bears against a shoulder $b^4$.

The parachute is provided with stays fixed to the members of the frame or to the canvas in order to prevent the parachute from being turned inside out through the pressure of the air during the fall. The crutch of the handle is arranged in such a manner that it can be attached to the aviator by means of a string. The lower end of the handle has a plate which bears against the spiral spring $b$ for compressing the same when the parachute is introduced into the tube. Rollers arranged on the outer surfaces of the members of the frame facilitate the exit of the parachute by reducing the friction. This exit which is effected through the action of a spiral spring can also be effected by means of a special cartridge to be ignited by the aviator. At the upper end of the handle a plate $g$ is fixed upon which a receptacle $h$ is mounted and which is adapted to be connected with the balloon $i$ by means of a valve $h^1$. This balloon designed to be automatically inflated with hydrogen compressed in the receptacle $h$, serves for stabilizing the parachute in the normal position and for preventing capsizing.

A locking bolt $j$ with two curved or straight branches serves for maintaining the parachute in the tube if the spring is compressed and also as a support for the tube if the same is placed upon the flying machine before the utilization of the parachute. This locking bolt traverses the side of the frame of the flying machine and the branches extend through orifices in the tube $a$ and bear against the upper surface of the plate $e$ in order to prevent the exit of the parachute.

A hand lever $k$ arranged in easy access of the aviator is connected to said locking bolt, and is adapted to pivot around the axle $k^1$.

The tube suspension device consists of a U-iron $l$ between the branches of which the tube is suspended by means of its pivot pins. The convex part of the U-iron is connected to a straight rod $l^1$ which traverses perpendicularly the centers of two or three parallel cross rods $l^2$ which are fixed in the frame of the flying machine. The orifices of the cross rods through which the rod $l^1$ passes must be large enough to permit free rotation of said rod.

The apparatus is mounted in the vertical plane of the axis of the flying machine between the sides of the frame, the axis of the tube forming with the axis of the frame of the flying machine a determined angle sufficiently great to prevent the parachute from interfering with the movements of the rudder.

The lower part of the tube which contains the spring is situated below the axis of the frame of the flying machine under the seat of the aviator the end of the parachute being situated above the frame of the flying machine.

The apparatus is operated in the following manner:—As soon as the aviator thinks it is necessary he grips the handle of the lever $k$ and depresses the same strongly whereby the locking bolt is pulled back. The cylinder being no longer retained, rotates around its pivot pins $a^1$ and adopts the vertical position the parachute being at the same time thrown up vertically through the action of the spiral spring $b$. The parachute opens automatically through the action of the spiral spring $b^2$ and participates for some movements in the descending movement of the flying machine but being immediately stopped by the pressure of the air the descending movement of the parachute becomes slower than that of the flying machine from which it separates. As the aviator is attached to the parachute he is lifted from his seat and remains suspended to the parachute which according to its surface area descends more or less rapidly on the earth. By increasing the power of the spiral spring $b$ of the cylinder the expulsion of the parachute can be regulated so that the aviator is very quickly lifted off his seat. Owing to the rapidity of expulsion the parachute acts properly, even at a very short distance from the ground. When the parachute is being expelled the valve $h^1$ of the gas receptacle $h$ is opened by means of the string $m$ so that gas under pressure flows from the receptacle $h$ into the balloon $i$. This balloon insures the vertical stability of the parachute and slackens the descending speed of the same.

I claim:

In a saving apparatus for aviators, a tube containing a spiral spring which is compressed by a plate fixed at the lower end of a handle of a parachute constructed like an umbrella, a spiral spring surrounding this handle for effecting the automatic opening of the parachute, a receptacle filled with compressed gas situated at the upper part of the handle and adapted to be connected with a balloon by means of an automatically operated valve; a locking device maintaining the parachute in the tube and the tube in an appropriate position so that it does not interfere with the manipulation of the flying machine; and a suspension permitting of the tube adopting the vertical position at any inclination of the flying machine.

In testimony whereof I affix my signature in presence of two witnesses.

CORNEILLE GUSTAVE
ERNEST TRUMELET-FABER.

Witnesses:
HENRI BOETTCHER,
HANSON C. COXE.

---

Copies of this patent may be obtained for five cents each, by addressing the "Commissioner of Patents, Washington, D. C."